US012314900B2

(12) United States Patent
Haynes et al.

(10) Patent No.: US 12,314,900 B2
(45) Date of Patent: May 27, 2025

(54) E-COMMERCE MIXED PARCEL PACKAGING AND SHIPPING PROCESS AND SYSTEMS

(71) Applicant: Stress Engineering Services, Inc., Mason, OH (US)

(72) Inventors: Clinton A. Haynes, Mason, OH (US); Douglas Lewis Marriott, South Lebanon, OH (US)

(73) Assignee: Stress Engineering Services, Inc., Mason, OH (US)

( * ) Notice: Subject to any disclaimer, the term of this patent is extended or adjusted under 35 U.S.C. 154(b) by 0 days.

(21) Appl. No.: 18/373,326

(22) Filed: Sep. 27, 2023

(65) Prior Publication Data

US 2024/0354695 A1    Oct. 24, 2024

Related U.S. Application Data

(60) Provisional application No. 63/460,830, filed on Apr. 20, 2023.

(51) Int. Cl.
*G06Q 10/087* (2023.01)
(52) U.S. Cl.
CPC ................................. *G06Q 10/087* (2013.01)
(58) Field of Classification Search
CPC ............................... G06Q 10/087; B65B 1/00
USPC .......................................................... 705/28
See application file for complete search history.

(56) References Cited

U.S. PATENT DOCUMENTS

| | | | | |
|---|---|---|---|---|
| 6,721,762 | B1 * | 4/2004 | Levine | G06Q 10/08 707/999.102 |
| 7,769,221 | B1 * | 8/2010 | Shakes | G06Q 10/087 705/28 |
| 10,370,136 | B1 * | 8/2019 | Linnell | B65B 57/00 |
| 11,365,020 | B1 * | 6/2022 | Diallo | B65B 9/093 |
| 2001/0017023 | A1 * | 8/2001 | Armington | B65B 55/20 53/472 |
| 2022/0101248 | A1 * | 3/2022 | Grant | G06F 40/20 |

FOREIGN PATENT DOCUMENTS

| | | | | |
|---|---|---|---|---|
| WO | WO-2022084307 A1 * | 4/2022 | | B65D 81/3825 |
| WO | WO-2022203480 A1 * | 9/2022 | | |

OTHER PUBLICATIONS

Kim, Harry C.; International Search Report and Written Opinion of the International Searching Authority issued in Int'l. Pat. App. No. PCT/US2024/024209; May 16, 2024; 14 pages.

* cited by examiner

*Primary Examiner* — Luna Champagne
(74) *Attorney, Agent, or Firm* — Frost Brown Todd LLP (57) ABSTRACT

A mixed parcel packaging system generates packaging instructions for mixed parcel orders, which includes shipping box size, product orientation, and selection and placement of packaging materials. The packaging instructions are based on quantitative product attributes of the products to be shipped, such that the fill volume of the shipping box is minimized subject to product fragility, leakage factors, and external environmental factors.

25 Claims, 10 Drawing Sheets

| | Product | Scaling | Product Category A | Product Category B | Product Category C | Product Category D | Product Category E |
|---|---|---|---|---|---|---|---|
| Dimensions | Length/Depth | | 10.5 | 2.5 | 3 | 4 | 4 |
| | Width | | 5 | 6 | 3 | 5 | 4 |
| | Height | | 10.5 | 5 | 10.5 | 5.5 | 8.5 |
| | Volume (cu. in) | | 551 | 75 | 99 | 110 | 136 |
| | Weight | | | | | | |
| Fragility Factors | Brittleness | 1 = Very Tough; 5 = Very Brittle/Fragile | 1 | 2 | 3 | 3 | 2 |
| | Softness | 1 = Very Hard; 5 = Very Soft | 2 | 2 | 2 | 2 | 2 |
| | Surface/Scratch Sensitivity | 1 = Unscratchable; 5 = Very easily scratches | 3 | 1 | 2 | 2 | 1 |
| | Thin Boundary | 1 = Very thick boundary; 5 = Very thin boundary | 2 | 3 | 4 | 3 | 3 |
| | Incompactness | 1 = Very smooth and compact; 5 = Very jagged | 5 | 4 | 3 | 4 | 1 |
| | Complexity | 1 = Very simple/stable; 5 = Very complex | 1 | 2 | 4 | 5 | 5 |
| | Fragility Index (F) | | | | | | |
| Hostility Factors | Strength | 1 = Very weak; 5 = Very strong | 3 | 2 | 3 | 3 | 3 |
| | Hardness | 1 = Very soft; 5 = Very hard | 4 | 3 | 3 | 2 | 2 |
| | Weight | 1 = Very light; 5 = Very heavy | 3 | 4 | 1 | 1 | 1 |
| | Sharpness | 1 = Very dull; 5 = Very sharp | 3 | 3 | 2 | 1 | 1 |
| | Abrasiveness | 1 = Smooth/unabrasive; 5 = Very abrasive | 3 | 2 | 2 | 2 | 1 |
| | Instability | 1 = Very stable; 5 = Very unstable | 3 | 1 | 2 | 3 | 5 |
| | Hostility Index (H) | | | | | | |
| Leakage Factors | Leak Potential | 0 = Absolutely no leak potential; 5 = High leak potential | 0 | 2 | 3 | 3 | 3 |
| | Leak Danger | 1 = Little leak consequence; 5 = Dangerous leak consequence | 4 | 3 | 4 | 1 | 1 |
| | Leakage Index (L) | | | | | | |
| Leak Sensitivity Factors | Leak Contamination | 1 = Impervious; 5 = Absorbent | 3 | 3 | 2 | 3 | 3 |
| | Seal Weakness | 1 = Impermeable; 5 = Weak seal | 4 | 3 | 3 | 3 | 3 |
| | Leak Permeation Danger | 1 = Barely affected by leak; 5 = Dangerous for leak permeation | 2 | 3 | 3 | 4 | 4 |
| | Leak Sensitivity Index (S) | | | | | | |

FIG. 5

| Packaging | | Bubble wrap | Cardboard divider | Rigid foam | Packing peanuts |
|---|---|---|---|---|---|
| | Strength | 1 = Very weak | | 5 = Very strong | |
| | | 1 | 4 | 5 | 2 |
| | Cushioning | 1 = Little cushioning | | 5 = Very cushioning | |
| | | 5 | 1 | 2 | 4 |
| | Seal Strength | 1 = Weak seal | | 5 = Strong seal | |
| | | 1 | 2 | 4 | 1 |
| | Packaging Index (P) | | | | |

FIG. 6

| External Factors | | | |
|---|---|---|---|
| | Static Overload | 1 = Light overload | 5 = Heavy overload |
| | Dynamic Impact | 1 = Small impacts | 5 = Large impacts |
| | Vibration | 1 = Light vibration | 5 = Heavy vibration |
| | Exposure | 1 = Little/no exposure | 5 = High exposure |
| | Local Loads | 1 = Small local loads | 5 = Heavy local loads |
| | External Factor Index (E) | | |

PACKING PROXIMITY MATRIX [X]

|  | ACTIVE (CAUSE DAMAGE) | | |
|---|---|---|---|
| PASSIVE (RECIPIENT OF DAMAGE) | PRODUCT 1 | PRODUCT 2 | PRODUCT 3 |
| PRODUCT 1 | 1 | .5 | .1 |
| PRODUCT 2 | .9 | 1 | 1 |
| PRODUCT 3 | .1 | 0 | 1 |

{ MEASURE OF IMPACT OF ONE ON THE OTHER BASED ON DISTANCE OR PACKING MATERIAL IN BETWEEN. }

FIG. 11

E-COMMERCE MIXED PARCEL PACKAGING AND SHIPPING PROCESS AND SYSTEMS

REFERENCE TO RELATED APPLICATION

This application claims priority to U.S. provisional patent application Ser. No. 63/460,830, entitled E-COMMERCE MIXED PARCEL PACKAGING AND SHIPPING PROCESS AND SYSTEMS, filed Apr. 20, 2023, and hereby incorporates this provisional patent application by reference herein in its entirety.

TECHNICAL FIELD

This application relates generally to packaging and shipping processes.

BACKGROUND

Distributors and sellers commonly package purchased products in shipping containers, such as shipping boxes, to send to customers. When a customer orders multiple products in one transaction, the distributor or seller often consolidates the items into a single shipping container to reduce material and shipping costs compared to individual packaging. However, improperly sized packaging or insufficient packing techniques can result in damage to the contents. Thus, while consolidating items can potentially decrease cost, among other downsides, this approach can increase the risks of product damage when the shipping container is in transit to the customer.

BRIEF DESCRIPTION OF THE DRAWINGS

It is believed that certain embodiments will be better understood from the following description taken in conjunction with the accompanying drawings in which:

FIG. 5 depicts example product rankings for various product categories, in accordance with an embodiment;

DETAILED DESCRIPTION

Various non-limiting embodiments of the present disclosure will now be described to provide an overall understanding of the principles of the structure, function, and use of the e-commerce mixed parcel packaging shipping systems and methods as disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Components and modules can be implemented in software, hardware, or a combination of software and hardware. The term software is used expansively to include not only executable code, but also data structures, data stores, and computing instructions in any electronic format, firmware, and embedded software. The terms information and data are used expansively and can include a wide variety of electronic information, including but not limited to machine-executable or machine-interpretable instructions; content such as text, video data, and audio data, among others; and various codes or flags. The terms information, data, and content are sometimes used interchangeably when permitted by context.

The examples discussed herein are examples only and are provided to assist in the explanation of the systems and methods described herein. None of the features or components shown in the drawings or discussed below should be taken as mandatory for any specific implementation of any of these systems and methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Embodiments of the e-commerce mixed parcel packaging shipping systems and methods described herein can provide numerous benefits to consumers as well as manufactures, retailers, and distributors. For instance, in accordance with the present disclosure, the fill volume of a shipping box for a mixed parcel order can be minimized, subject to product fragility and product structure considerations. The systems and techniques described herein can also assist with minimizing packing costs while also reducing mixed parcel shipment damage. In some embodiments, the e-commerce mixed parcel packaging shipping systems and methods can leverage customer feedback, or other external information, as inputs to the packaging decisioning processes. With specific regard to external information, some example systems and methods can utilize delivery vehicle monitoring and/or shipping route information to provide a more holistic picture of the shipping process, which can aid in the automated determination of appropriate packaging on a per-order basis.

Figure 1:
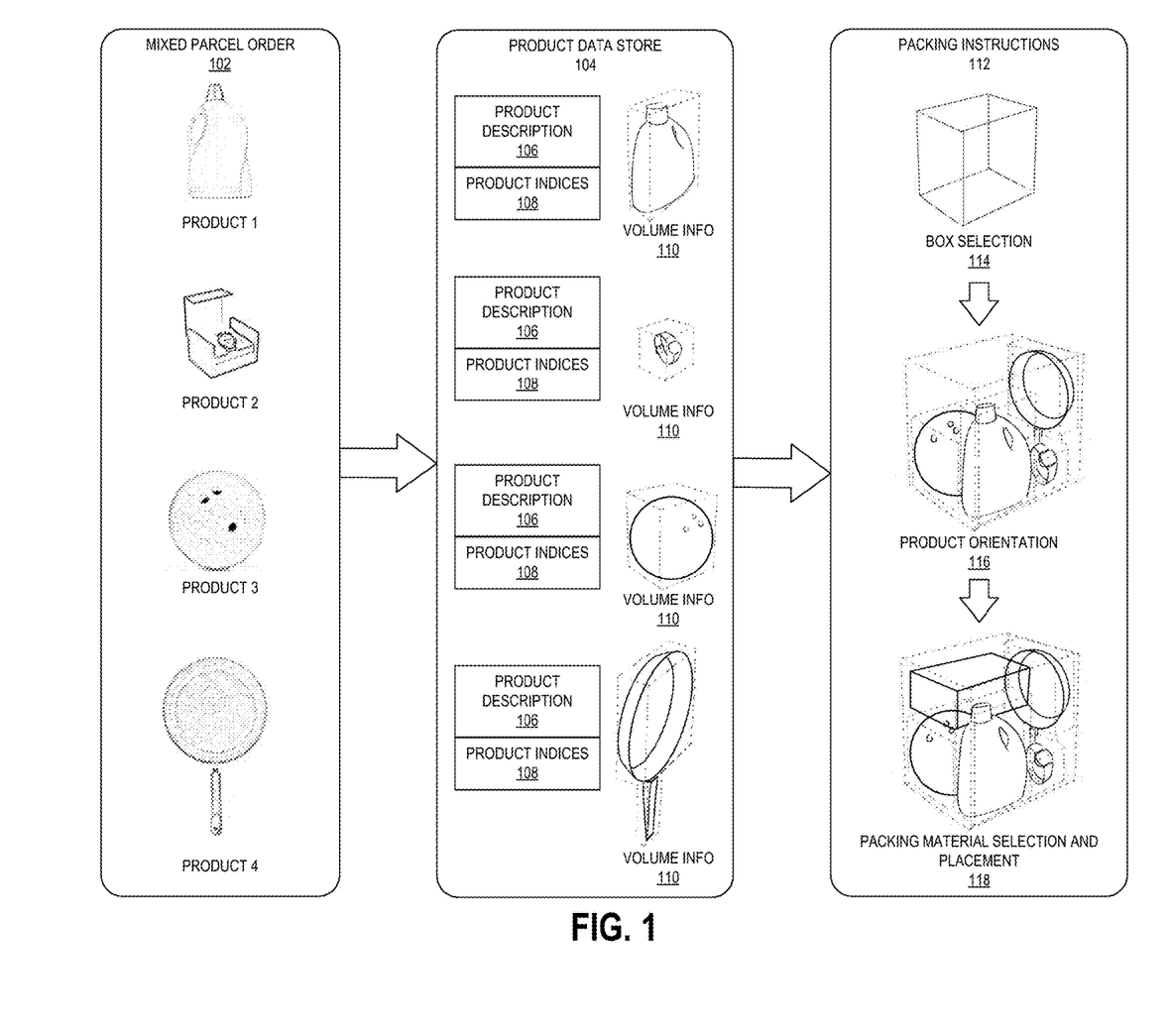
FIG. 1 depicts an example packaging and shipping decisioning process for a mixed parcel order, in accordance with one embodiment.

FIG. 1 schematically depicts an example packaging and shipping decisioning process for a mixed parcel order, in accordance with one embodiment. A mixed parcel order 102 can identify a plurality of products, shown as products 1-4, that are to be shipped to a consumer. In accordance with the present disclosure, a product data store 104 can store information associated with each product identified in the mixed parcel order 102. For instance, the data store 104 can store a product description 106, which can include information received from a manufacturer of the product, for example, or other data source. The data store 104 can also store one or more product indices 108, which can be utilized to quantify certain aspects of each of the products that can be used in the packaging and shipping decisioning described herein. In some embodiments, the product indices 108 are ranking indices to provide a relative performance of each product in a variety of different categories, such as fragility and leakage sensitivity, among others, as described in more detail below. The data store 104 can also store physical property information for the product, such as volume information 110, which can be relevant to optimizing the packing and shipping process.

Based on the mixed parcel order 102 and the product information stored in the product data store 104, packing instructions 112 can be generated that are optimized based on the performance and physical properties of the particular products identified in the mixed parcel order 102. In this regard, the packing instructions 112 can include the selection of a particular shipping box 114 (either pre-made or custom-made), with the size of the selected box selected based on the total volume of the products identified in the mixed parcel order 102 and their optimized placement orientation. The packing instructions 112 can further identify the specific orientation of each of the products 116, with the product orientations based at least partially on the product indices 108 associated with each of the products, as described in more detail below. The packing instructions 112 can also further identify a particular type of packing material or collection of packing materials to be placed within the shipping box and provide instructions for such placement.

The packing instructions 112 can be conveyed in any suitable format, such as graphical step-by-step instructions, animated instructions, auditory instructions, or other approach suitable for shipping personnel to consume. For example, the packing instructions 112 for the mixed parcel order 102 can be presented on a graphical interface positioned proximate to a shipping cell. For automated packing and shipping stations, the packing instructions 112 can be provided to fulfillment machinery for automated execution thereof.

Figure 2:
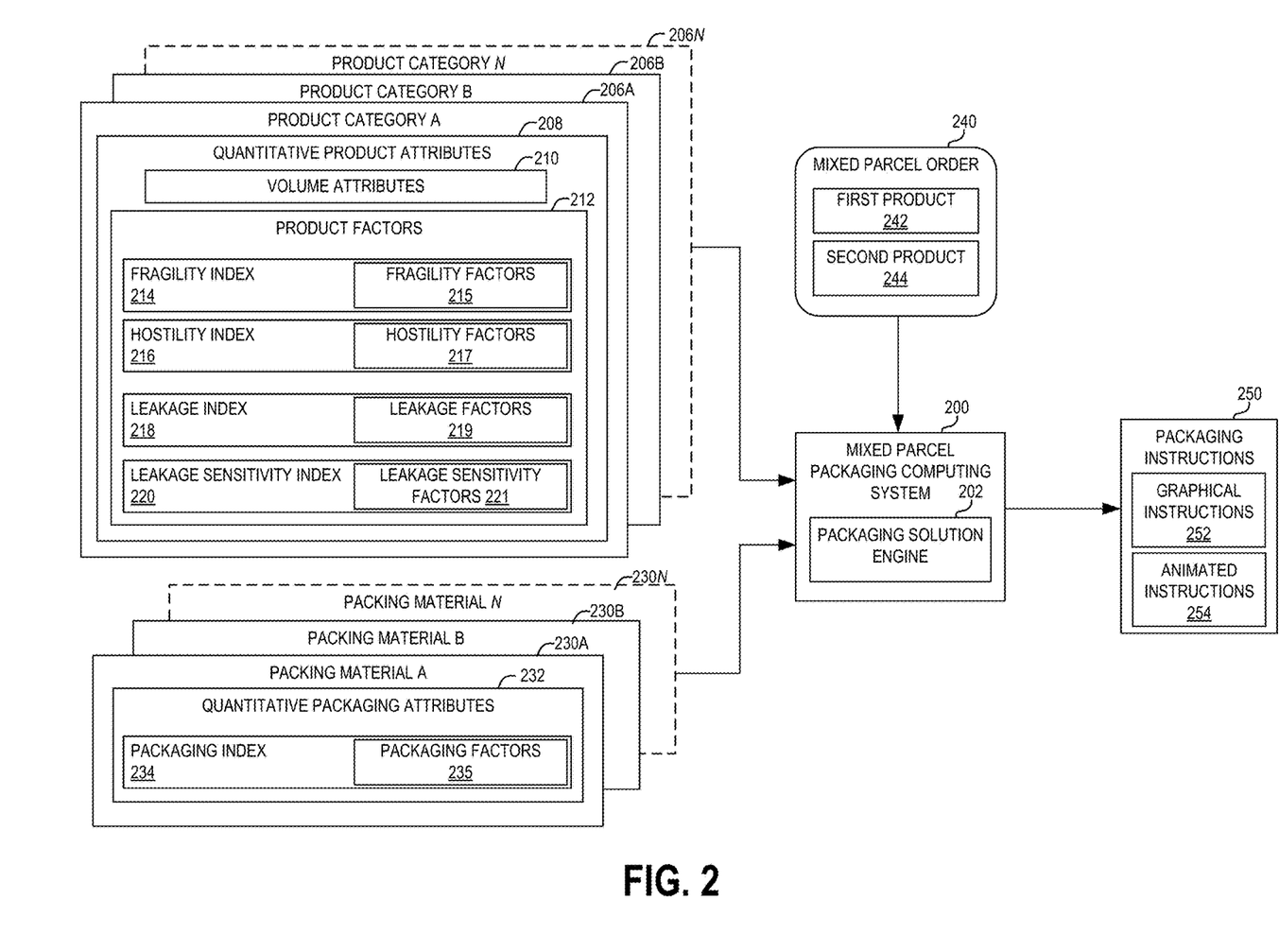
FIG. 2 depicts a mixed parcel packaging computing system generating packaging instructions for a mixed parcel order, in accordance with one embodiment.
Figure 6:
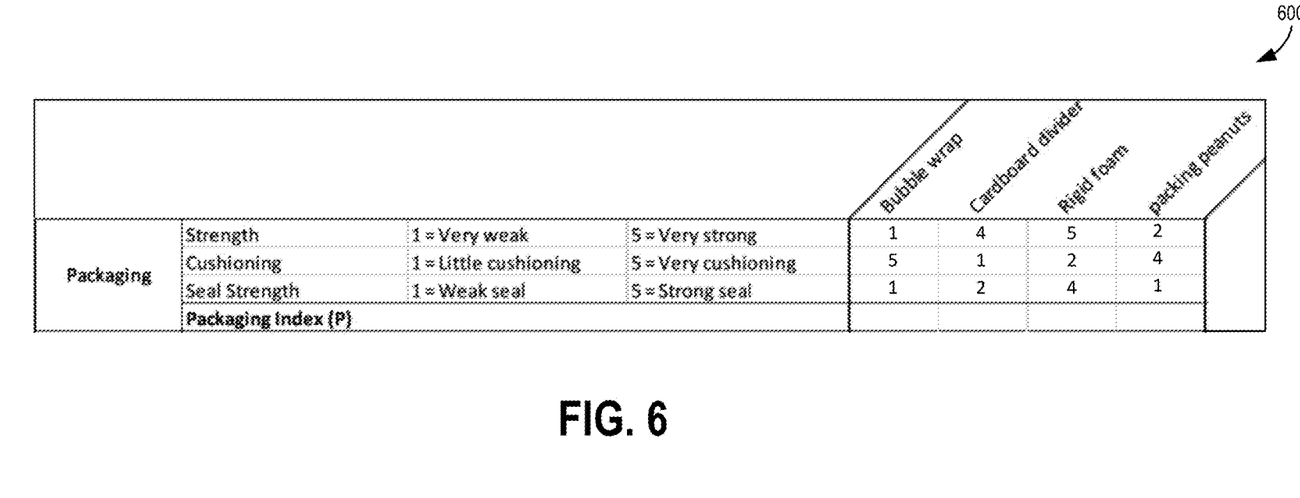
FIG. 6 depicts example packaging rankings for various packing materials, in accordance with an embodiment.

FIG. 2 depicts a mixed parcel packaging computing system 200 generating packaging instructions 250 for a mixed parcel order 240, in accordance with one embodiment. In the illustrated embodiment, the mixed parcel order 240 identifies a first product 242 and a second product 244. The mixed parcel order 240 can be generated by an e-commerce platform, although this disclosure is not so limited. Each of the first product 242 and second product 244 can belong to one of a plurality of different product categories 206A-N. Each product category 206A-N can be associated with a plurality of quantitative product attributes 208. Such quantitative product attributes 208 can include, for example, volume attributes 210 and product factors 212. In some embodiments, the product factors 212 can help to define various ranking indices that quantify the performance of that product category in a variety of different areas. In the illustrated example, the product factors 212 include a fragility index 214, a hostility index 216, a leakage index 218, and a leakage sensitivity index 220. The fragility index 214 can be based on a plurality of fragility factors 215 for the associated product category. The hostility index 216 can be based on a plurality of hostility factors 217 for the associated product category. The leakage index 218 can be based on a plurality of leakage factors 219 for the associated product category. The leakage sensitivity index 220 can be based on a plurality of leakage sensitivity factors 221 for the associated product category. Non-limiting examples of fragility factors, hostility factors, leakage factors, and leakage sensitivity factors are illustrated in FIG. 5, below. Additionally, quantitative packaging attributes 232 for each of a plurality of different packing materials 230A-N can be identified. Such quantitative packaging attributes 232 can define a packaging index 234 based on packaging factors 235 for each of the packing materials 230A-N. Non-limiting examples of packaging factors are illustrated in FIG. 6, below.

Figure 11:
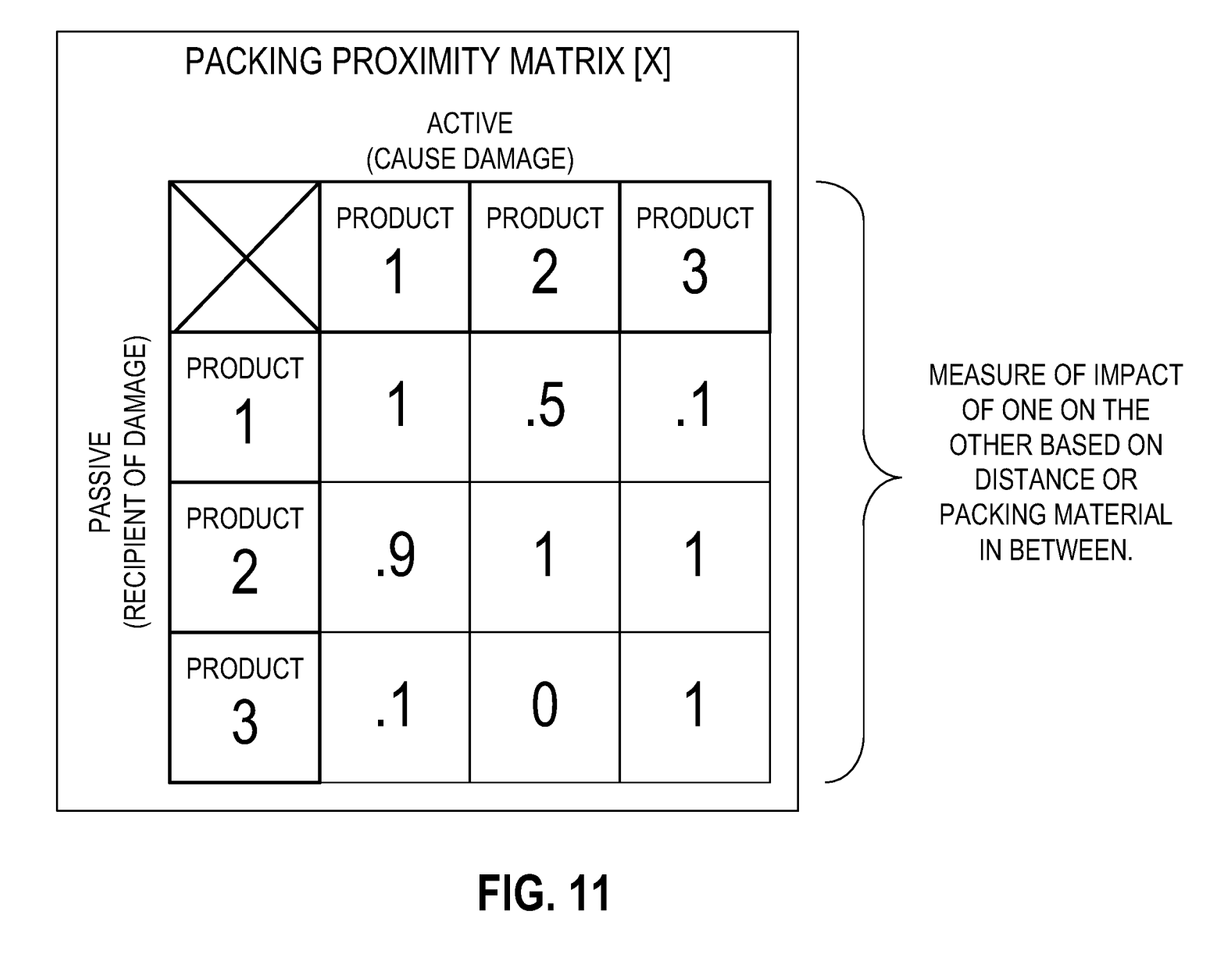
FIG. 11 illustrates an example packing proximity matrix.

Based on the product factors 212 of each of the products in the mixed parcel order 240, a packaging solution engine 202 of the mixed parcel computing system 200 can perform processing to generate the packaging instructions 250, which can be specially optimized based on the order. In some embodiments, the volume attributes 210 of each of the first product 242 and the second product 244 (and any other products that are identified in the mixed parcel order 240) can be used to initially select a size of the shipping box for the order. Next, according to various embodiments, the relative shipping compatibility of each of the products in the mixed parcel order 240 can be determined based on their respective product factors 212. In some implementations, a packing proximity matrix is generated that measures the potential impact of each product on each of the other products in the mixed parcel order to assist with determining relative placement of the products within the shipping box. An example packing proximity matrix is illustrated in FIG. 11. The packaging solution engine 202 can take into account other considerations, which can be quantified by the relative indices associated with each product.

In some embodiments, the packing instructions 250 can be generated such that certain thresholds for certain factors are satisfied, such as a Leak Risk Factor ($R_L$) and a Failure Risk Factor ($R_F$):

$$R_L = E\left(\frac{L \cdot S}{P \cdot X}\right) \qquad \text{EQ. 1}$$

where E=External environmental factors;
L=Leakage risk of aggressive products;
S=Leak sensitivity of passive products;
P=Packaging factors; and
X=Proximity factor.

$$R_F = E\left(\frac{F \cdot H}{P \cdot X}\right) \qquad \text{EQ. 2}$$

where E=External environmental factors;
F=Fragility;
H=Hardness;
P=Packaging factors; and
X=Proximity factor.

For a particular mixed parcel order 240, a large Leak Risk Factor ($R_L$) is indicative of a high risk of leak damage, and a large Failure Risk Factor ($R_F$) is indicative of a high rate of damage. Therefore, in some embodiments, the packaging solution engine 202 can calculate the packaging factor (P) to generate a Leak Risk Factor ($R_L$) for the shipment that is beneath a desired threshold amount. Similarly, the packaging solution engine 202 can calculate packaging factors (P) to generate a Failure Risk Factor ($R_F$) for the shipment that is beneath a desired threshold amount.

The quantitative packaging attributes 232 can be utilized by the packaging solution engine 202 to assess which specific packing material 230A-N can provide the necessary packaging factor (P) to satisfy the various risk factors. In some embodiments, the packaging solution engine 202 can iteratively step through a plurality of different factor assessments and evaluate each based on the quantitative product attributes 208 of the products of the mixed parcel order 240. Upon reaching a satisfactory packaging solution for the mixed parcel order 240, packaging instructions 250 can be generated that specifically identify how the shipping box is to be packed for the mixed parcel order 240. The packaging instructions 250 can be provided to a recipient using any suitable technique. Such recipient can be, for example, a person that is manually packing the shipping box in accordance with the packaging instructions 250 or the recipient can be an automated packing and shipping system that is configured to execute the packing instructions 250 to pack the shipping box. The packaging instructions 250 can be conveyed in any suitable format, such as graphical instructions 252 showing step-by-step instructions for orienting and placing each product, as well as the selected packing material, in the selected shipping box. In other embodiments, the packaging instructions 250 can be conveyed as animated instructions 254 showing a video animation of the placement of each product and the selected packing material within the selected shipping box.

Figure 3:
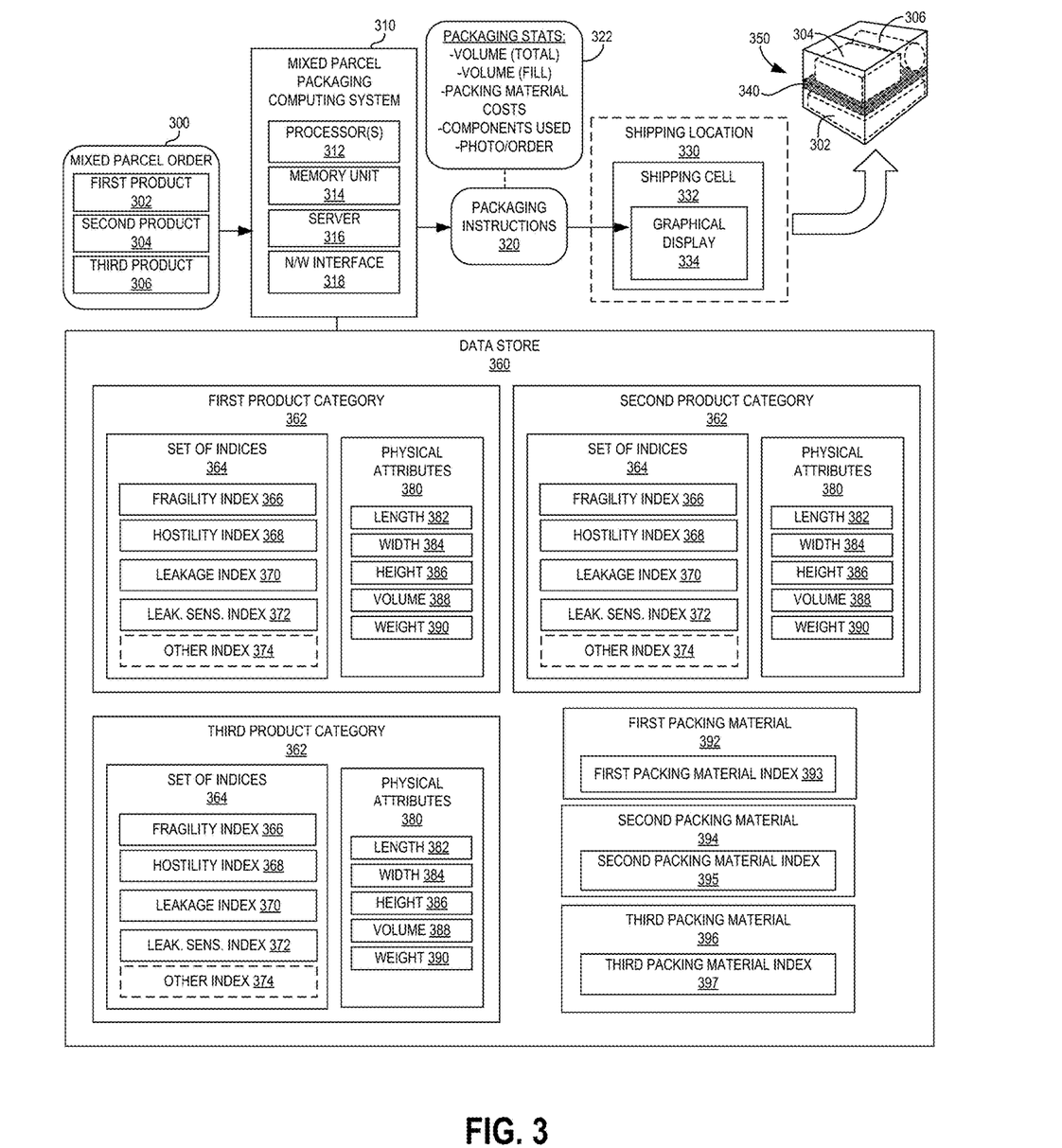
FIG. 3 depicts a mixed parcel packaging computing system generating packaging instructions for a mixed parcel order, in accordance with another embodiment.

FIG. 3 depicts a mixed parcel packaging computing system 310 generating packaging instructions 320 for a mixed parcel order 300, in accordance with another embodiment. In the illustrated embodiment, the mixed parcel order 300 identifies a first product 302, a second product 304, and a third product 306. The first product 302, the second product 304, and the third product 306 can each belong to one of the product categories 362. As schematically shown, each product category 362 can be associated with a set of indices 364 and physical attributes 380, which can be stored in a data store 360. By way of non-limiting examples, the set of indices 364 can include a fragility index 366, a hostility index 368, a leakage index 370, a leakage sensitivity index 372, and/or other indices 374, although this disclosure is not so limited. The physical attributes 380 associated with the product category 352 can include, without limitation, length 382, width 384, height 386, volume 388, and weight 390. The data store 360 can also store information for various packing materials, such as an associated packaging material index that quantifies the performance of each packing material. In the illustrated embodiment, the data store 360 includes a first packing material index 393 for a first packing material 392, a second packing material index 395 for a second packing material 394, and a third packing material index 397 for a third packing material 396.

The mixed parcel packaging computing system 310 can be provided using a processor-based device or system specially configured to provide the services described herein. The mixed parcel packaging computing system 310 can include one or more processors 312 and one or more computer memory units 314. For convenience, only one processor 312 and only one memory unit 314 are shown in FIG. 3. The processor 312 can execute software instructions stored on the memory unit 314. The processor 312 can be implemented as an integrated circuit (IC) having one or multiple cores. The memory unit 314 can include volatile and/or non-volatile memory units. Volatile memory units can include random access memory (RAM), for example. Non-volatile memory units can include read only memory (ROM), for example, as well as mechanical non-volatile memory systems, such as, for example, a hard disk drive, an optical disk drive, etc. The RAM and/or ROM memory units can be implemented as discrete memory ICs, for example. Embodiments of the mixed parcel packaging computing system 310 can also be implemented in cloud computing environments. "Cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

In some embodiments, a server 316 can provide a graphical web user interface through which various users or entities can interact with the mixed parcel packaging computing system 310. The server 316 can accept requests, such as HTTP requests, from clients and serve the clients responses. In some embodiments, the server 316 can provide a user interface for users or entities who do not communicate with the mixed parcel packaging computing system 310 using a web browser. Such users can have, for example, specialized software installed on their computing system that allows them to communicate with the mixed parcel packaging computing system 310 via a network, for example. In some embodiments, the mixed parcel packaging computing system 310 can include various network interfaces 318 that facilitated network communications, such as Application Programming Interface (API) communications and the like.

Based on the mixed parcel order 300, in some embodiments, the mixed parcel packaging computing system 310 can first determine the size of shipping box 350 using the physical attributes 380 of the first product 302, the second product 304, and the third product 306. Next, the mixed parcel packaging computing system 310 can determine optimal proximity of each product relative to each other inside the shipping box 350, as well as the optimal type of packing material to use, based on the indices 364 and the various packaging material indices. In some embodiments, the mixed parcel packaging computing system 310 can provide various packaging statistics 322 for the mixed parcel order 300, examples of which are shown in FIG. 3.

The packaging instructions 320 can be provided, for example, to a graphical display 334 within a shipping cell 332 at a shipping location 330. Based on the instructions, a shipping box 350 can be packed with each of first product 302, the second product 304, and the third product 306, along with selected packing material 340, in a particularly defined orientation which seeks to minimize certain risks, such as leakage risks and failure risks.

Figure 4:
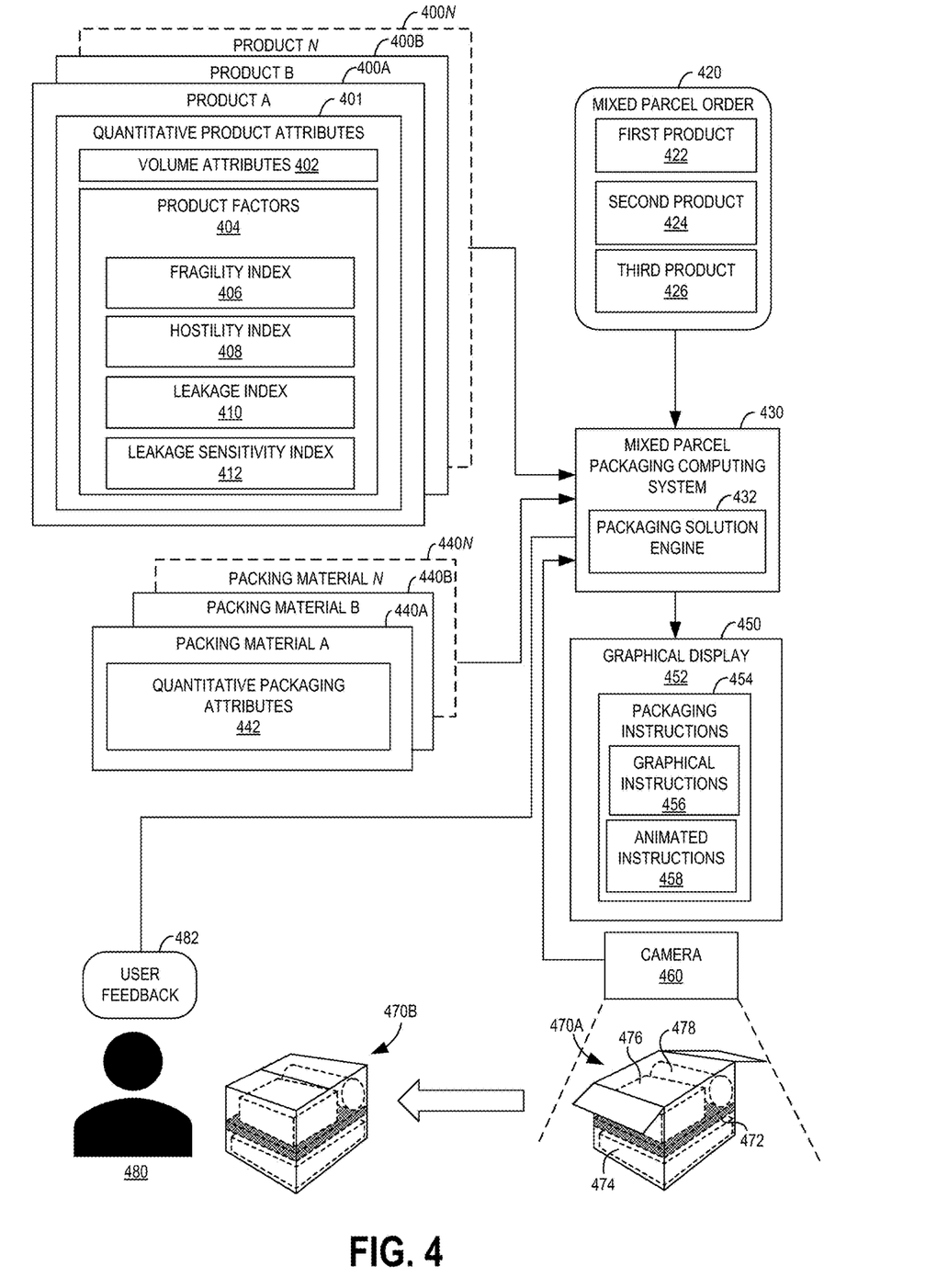
FIG. 4 depicts a mixed parcel packaging computing system utilizing user feedback to generate packaging instructions for a mixed parcel order, in accordance with yet another embodiment.

Referring now to FIG. 4, a mixed parcel packaging computing system 430 is depicted that utilizes user feedback 482 to generate improved packaging instructions 545, in accordance with yet another embodiment. Similar to previous embodiments, a mixed parcel order 420 can identify a first product 422, a second product 424, and a third product 426. In this embodiment, as opposed to utilizing product categories, quantitative product attributes 401 are provided on a product level, shown as products 400A-N. The quantitative product attributes 401 can include volume attributes 402 and product factors 404. The product factors 404 can include a fragility index 406, a hostility index 408, a leakage index 410, a leakage sensitivity index 412, and/or other indices. Additionally, quantitative packaging attributes 442 for each of a plurality different packing materials 440A-N can be identified.

In this example embodiment, a packaging solution engine 432 determines the packaging instructions 454 based on the product factors 404 and the volume attributes 402 of the products identified in mixed parcel order 420, as well as the packaging performance requirements of the packaging material to be included in the shipping box. The packaging instructions 454 can be presented on a graphical display 452. Similar to previous embodiments, the packaging instructions 454 can be presented in any suitable format such as graphical instructions 456, animated instructions 458, or otherwise. Based on the instructions, a shipping box 470A can be packed with each of first product 422, the second product 424, and the third product 426, along with selected packing material 474, in a particular relative orientation. In this embodiment, a camera 460 can be utilized to capture an image of the shipping box 470A after it has been packed but before it is sealed. This image can be associated with the packaging instructions 454, such as with its packaging statistics, such as packaging statistics 322 (FIG. 3). The sealed shipping box 470B can then be delivered to the consumer 480. If the consumer 480 reports user feedback 482, such as reporting damaged products, the mixed parcel packaging computing system 430 can update its processing to mitigate the likelihood of such damage occur again. Further, it is noted that the use of a camera to log the implementation of the packaging instructions and/or leveraging user feedback to increase performance of the system can be utilized in any of embodiment of the present disclosure.

FIG. 5 depict example non-limiting product rankings 500 for various product categories. Such product rankings 500 can be stored in a data store and leveraged by a mixed parcel packaging computing system to generate packing instructions.

FIG. 6 depict example non-limiting packaging rankings 600 for various packing materials. Such packaging rankings 600 can be stored in a data store and, along with the product rankings 500, can be leveraged by a mixed parcel packaging computing system to generate packing instructions.

Figure 7:
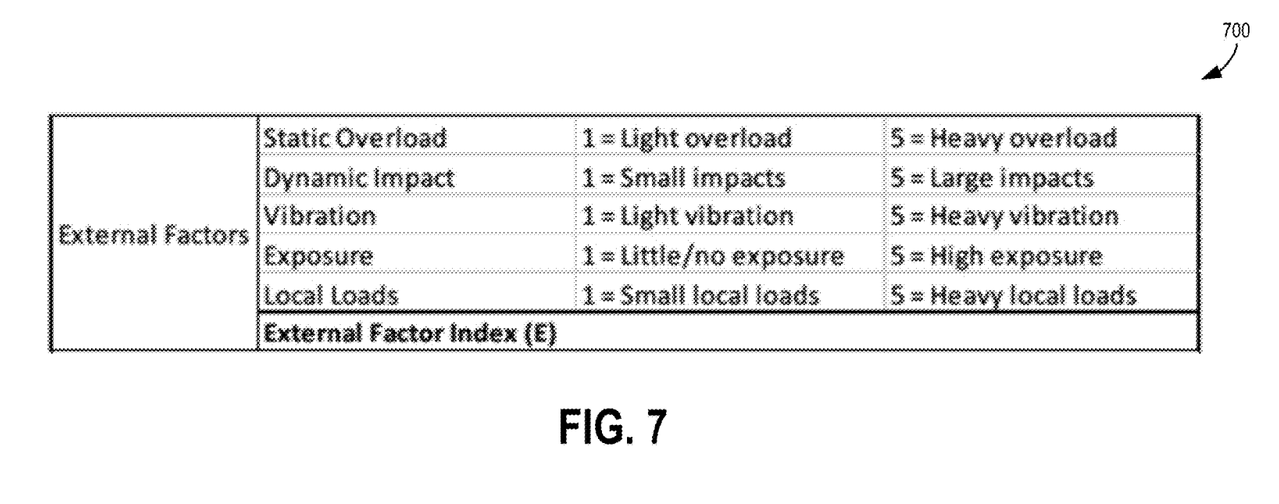
FIG. 7 depicts example external factor rankings for various external factors, in accordance with an embodiment.

FIG. 7 depict example non-limiting external factor rankings 700 for various external factor. Such external factor rankings 700 can be used in the assessment of the Leak Risk Factor ($R_L$) and a Failure Risk Factor ($R_F$) for a particular shipment. By way of example, the environmental conditions that the package is likely to experience during transit can be used in determining the packing instructions that are generated by the mixed parcel packaging computing system.

Figure 8:
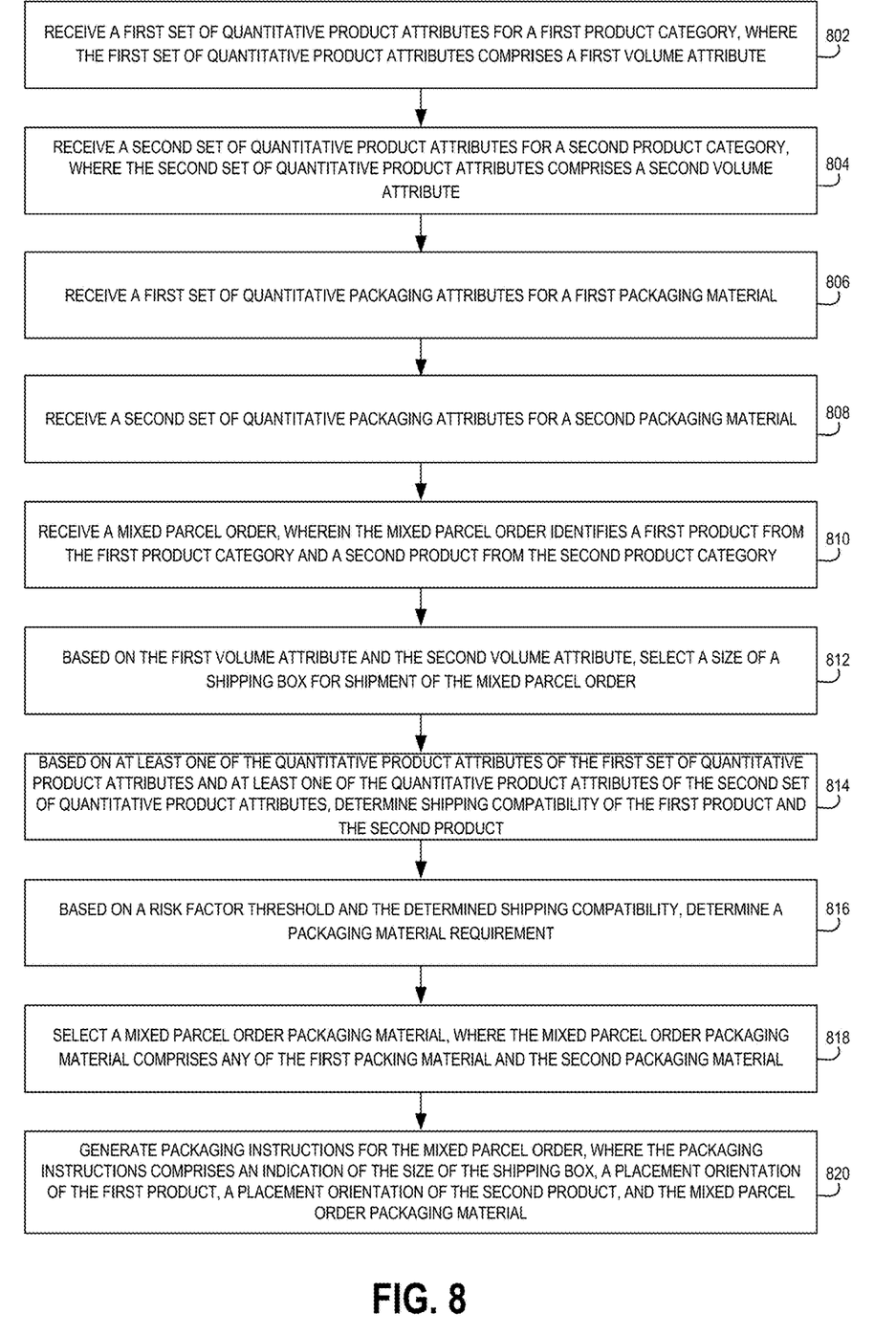
FIG. 8 is an example method of generating packaging instructions for a mixed parcel order, in accordance with one embodiment.

FIG. 8 is an example method of generating packaging instructions for a mixed parcel order, in accordance with one embodiment, that can be performed by one or more computing devices. At 802, a first set of quantitative product attributes for a first product category is received. The first set of quantitative product attributes can comprise a first volume attribute. At 804, a second set of quantitative product attributes for a second product category is received. The second set of quantitative product attributes can comprise a second volume attribute. In some embodiments, such product attributes are received from a manufacturer of the product. At 806, a first set of quantitative packaging attributes for a first packing material is received. At 808, a second set of quantitative packaging attributes for a second packing material is received. At 810, a mixed parcel order is received. The mixed parcel order can identify a first product from the first product category and a second product from the second product category. At 812, based on the first volume attribute and the second volume attribute, a size of a shipping box for shipment of the mixed parcel order is selected. At 814, based on at least one of the quantitative product attributes of the first set of quantitative product attributes and at least one of the quantitative product attributes of the second set of quantitative product attributes, shipping compatibility of the first product and the second product is determined. Such compatibility can be based on, for example, evaluating a Leak Risk Factor ($R_L$) and a Failure Risk Factor ($R_F$). At 816, based on a risk factor threshold and the determined shipping compatibility, a packing material requirement can be determined. Such packing material requirement can be determined to such that certain risk factors associated with mixed parcel order are beneath acceptable threshold levels, for example. At 818, a mixed parcel order packing material can be selected, where the mixed parcel order packing material comprises any of the first packing material and the second packing material. At 820, packaging instructions can be generated for the mixed parcel order, where the packaging instructions can comprise an indication of the size of the shipping box, a placement orientation of the first product, a placement orientation of the second product, and the mixed parcel order packing material.

Figure 9:
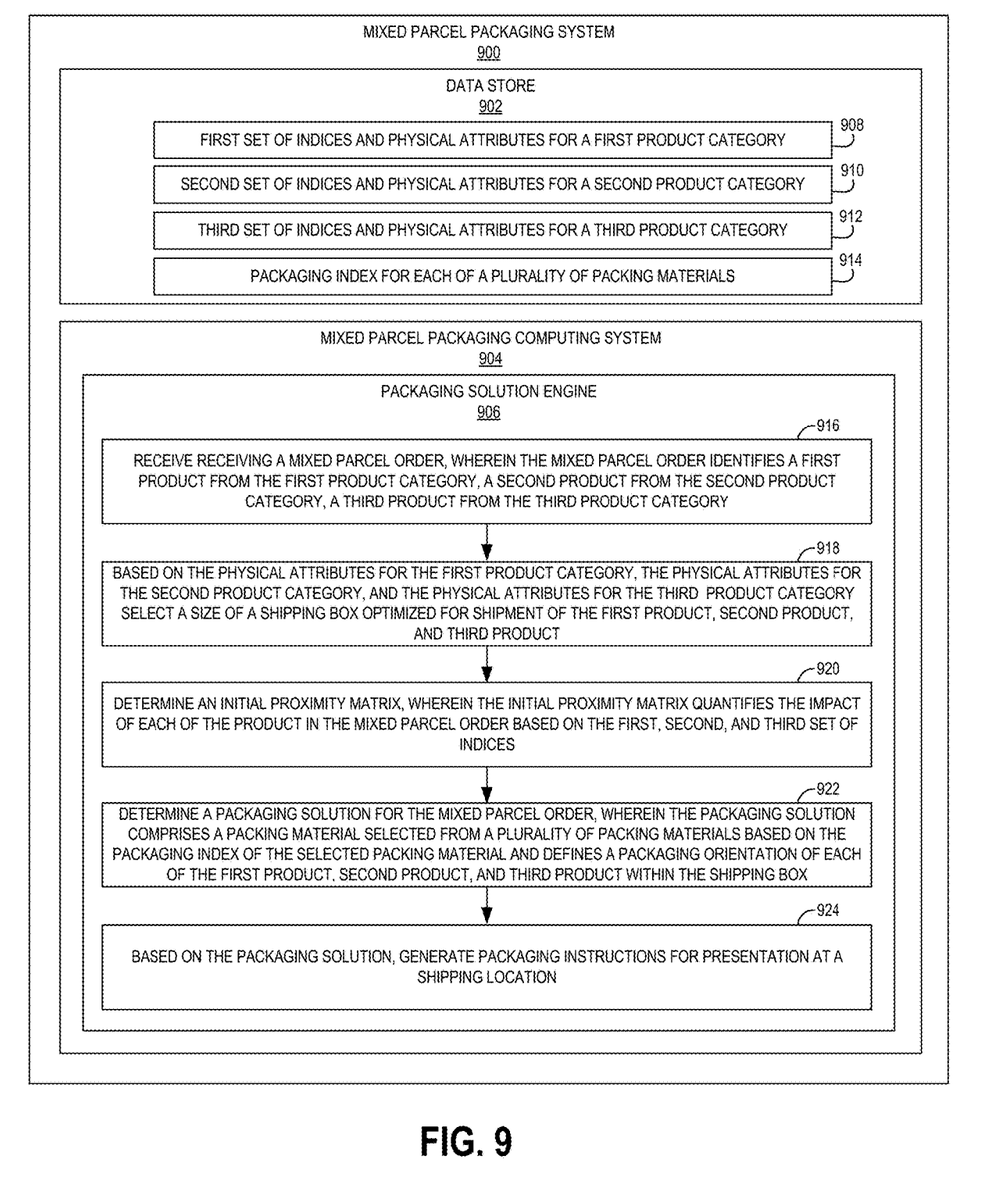
FIG. 9 depicts an example mixed parcel packaging system, in accordance with one embodiment.

FIG. 9 depicts an example mixed parcel packaging system, in accordance with one embodiment. The mixed parcel packaging system can include a data store 902 and a mixed parcel packaging computing system 904. The data store 902 can store, for example, a first set of indices and physical attributes for a first product category 908, a second set of indices and physical attributes for a second product category 910, a third set of indices and physical attributes for a third product category 912, and a packaging index for each of a plurality of packing materials 914. The mixed parcel packaging computing system 904 can include a packaging solution engine 906 that is configured to perform the example functions illustrated in FIG. 9. At 916, the packaging solution engine 906 can receive a mixed parcel order, where the mixed parcel order identifies a first product from the first product category, a second product from the second product category, and a third product from the third product category. At 918, based on the physical attributes for the first product category, the physical attributes for the second product category, and the physical attributes for the third product category, the packaging solution engine 906 can select a size of a shipping box optimized for shipment of the first product, second product, and third product. At 920, the packaging solution engine 906 can determine an initial proximity matrix, where the initial proximity matrix quantifies the impact of each of the products in the mixed parcel order based on the first, second, and third set of indices. An example packing proximity matrix is illustrated in FIG. 11. At 922, the packaging solution engine 906 can determine a packaging solution for the mixed parcel order, where the packaging solution comprises a packing material selected from the plurality of packing materials based on the packaging index of the selected packing material and defines a packaging orientation of each of the first product, second product, and third product within the shipping box. At 924, based on the packaging solution, the packaging solution engine 906 can generate packaging instructions for presentation at a shipping location.

Figure 10:
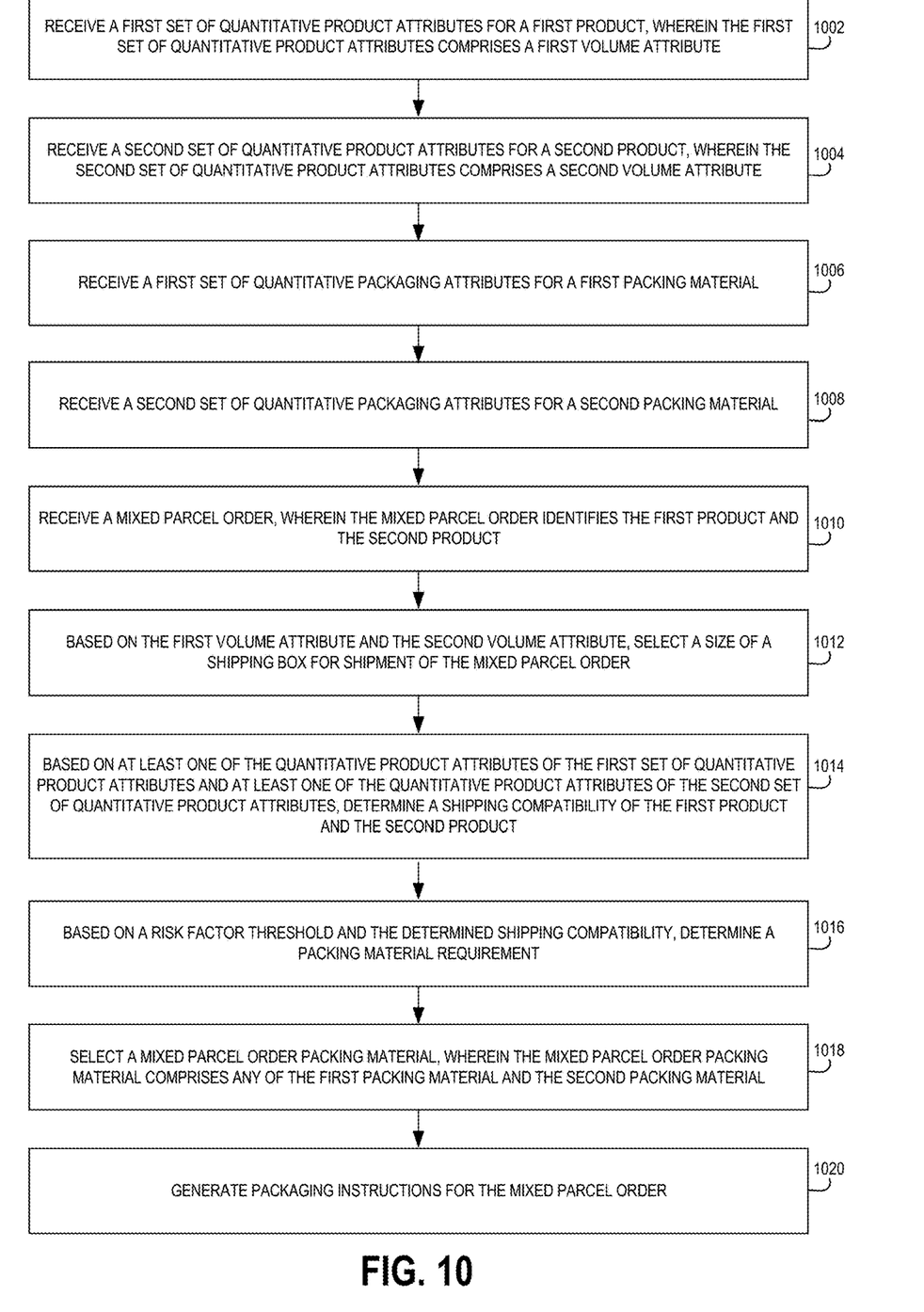
FIG. 10 is another example method of generating packaging instructions for a mixed parcel order, in accordance with one embodiment.

FIG. 10 is another example method of generating packaging instructions for a mixed parcel order, in accordance with one embodiment. At 1002, a mixed parcel packaging computing system can receive a first set of quantitative product attributes for a first product, where the first set of quantitative product attributes comprises a first volume attribute. At 1004, the mixed parcel packaging computing system can receive a second set of quantitative product attributes for a second product, where the second set of quantitative product attributes comprises a second volume attribute. At 1006, the mixed parcel packaging computing system can receive a first set of quantitative packaging attributes for a first packing material. At 1008, the mixed parcel packaging computing system can receive a second set of quantitative packaging attributes for a second packing material. At 1010, the mixed parcel packaging computing system can receive a mixed parcel order, where the mixed parcel order identifies the first product and the second product. At 1012, based on the first volume attribute and the second volume attribute, the mixed parcel packaging computing system can select a size of a shipping box for shipment of the mixed parcel order. At 1014, based on at least one of the quantitative product attributes of the first set of quantitative product attributes and at least one of the quantitative product attributes of the second set of quantitative product attributes, the mixed parcel packaging computing system can determine a shipping compatibility of the first product and the second product. At 1016, based on a risk factor threshold and the determined shipping compatibility, the mixed parcel packaging computing system can determine a packing material requirement. At 1018, the mixed parcel packaging computing system can select a mixed parcel order packing material, where the mixed parcel order packing material comprises any of the first packing material and the second packing material. At 1020, the mixed parcel packaging computing system can generate packaging instructions for the mixed parcel order.

The foregoing description of embodiments and examples of the disclosure has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate the principles of the disclosure and various embodiments as are suited to the particular use contemplated. In some embodiments, the drawings can be understood to be drawn to scale. The scope of the disclosure is, of course, not limited to the examples or embodiments set forth herein, but can be employed in any number of applications and equivalent devices by those of ordinary skill in the art. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A computer-based method, the method performed by one or more computing devices, the method comprising:
   receiving, by a packaging solution engine, a first set of quantitative product attributes for a first product category, wherein the first set of quantitative product attributes comprises a first volume attribute;
   receiving, by the packaging solution engine, a second set of quantitative product attributes for a second product category, wherein the second set of quantitative product attributes comprises a second volume attribute;
   receiving, by the packaging solution engine, a first set of quantitative packaging attributes for a first packing material;
   receiving, by the packaging solution engine, a second set of quantitative packaging attributes for a second packing material;
   receiving, by the packaging solution engine, a mixed parcel order, wherein the mixed parcel order identifies a first product from the first product category and a second product from the second product category;
   based on the first volume attribute and the second volume attribute, selecting, by the packaging solution engine, a size of a shipping box for shipment of the mixed parcel order;
   determining, by the packaging solution engine, an initial proximity matrix providing quantified active damage measurements and passive damage measurements for each of the first product and the second product in the mixed parcel order, wherein each of the active damage measurements and passive damage measurements are based on:
      stored product-to-product interaction data,
      type and amount of packing material between the products,
      a leakage risk and leak sensitivity for each product, and
      the first and second sets of quantitative product attributes;
   iteratively optimizing, by the packaging solution engine, a three-dimensional arrangement of the first product and the second product by:

calculating a current risk factor score based on the initial proximity matrix, external environmental factors, and selected packing materials, modifying product orientations and packing material selections when the risk factor score exceeds a threshold, and recalculating the risk factor score until the threshold is satisfied;

generating, by the packaging solution engine, packaging instructions comprising the optimized three-dimensional arrangement, packing material specifications, and product orientations;

capturing with a camera an image of the shipping box subsequent to packaging of the mixed parcel order in accordance with the packaging instructions and prior to sealing of the shipping box for shipment;

associating the image of the shipping box with packaging statistics for the mixed parcel order; and responsive to a report of damage to any of the first product or the second product during shipment of the mixed parcel order, reviewing the image to confirm correct implementation of the packaging instructions.

2. The computer-based method of claim 1, wherein each of the first set of quantitative product attributes and the second set of quantitative product attributes comprises a plurality of product factors.

3. The computer-based method of claim 2, wherein the plurality of product factors comprises a fragility factor.

4. The computer-based method of claim 3, wherein the fragility factor is one of a plurality of fragility factors that collectively define a fragility index.

5. The computer-based method of claim 2, wherein the plurality of product factors comprises a hostility factor.

6. The computer-based method of claim 5, wherein the hostility factor is one of a plurality of hostility factors that collectively define a hostility index.

7. The computer-based method of claim 2, wherein the plurality of product factors comprises a leakage factor.

8. The computer-based method of claim 7, wherein the leakage factor is one of a plurality of leakage factors that collectively define a leakage index.

9. The computer-based method of claim 2, wherein the plurality of product factors comprises a leakage sensitivity factor.

10. The computer-based method of claim 9, wherein the leakage sensitivity factor is one of a plurality of leakage sensitivity factors that collectively define a leakage sensitivity index.

11. The computer-based method of claim 2, wherein each of the first set of quantitative product attributes and the second set of quantitative product attributes comprises a fragility index, a hostility index, a leakage index, and a leakage sensitivity index.

12. The computer-based method of claim 2, wherein a packaging index of the first packing material is defined by the first set of quantitative packaging attributes of the first packing material, and wherein a packaging index of the second packing material is defined by the second set of quantitative packaging attributes of the second packing material.

13. The computer-based method of claim 12, wherein selecting the mixed parcel order packing material is based at least partially on the packaging index of the first packing material and the packaging index of the second packing material.

14. The computer-based method of claim 1, wherein the determining the initial proximity matrix of the first product and the second product is at least partially based on packaging proximity within the shipping box.

15. The computer-based method of claim 1, wherein the packaging instructions for the mixed parcel order comprise graphical instructions for presentation on a graphical display.

16. The computer-based method of claim 15, wherein the graphical instructions comprise an animation representing the first product, the second product, and the mixed parcel order packing material.

17. A mixed parcel packaging system, comprising:
a data store comprising:
a first set of indices and physical attributes for a first product category;
a second set of indices and physical attributes for a second product category;
a third set of indices and physical attributes for a third product category; and
a packaging index for each of a plurality of packing materials; and
a mixed parcel packaging computing system, the mixed parcel packaging computing system configured to:
receive a mixed parcel order, wherein the mixed parcel order identifies a first product from the first product category, a second product from the second product category, and a third product from the third product category;
based on the physical attributes for the first product category, the physical attributes for the second product category, and the physical attributes for the third product category, select a size of a shipping box optimized for shipment of the first product, the second product, and the third product;
determine an initial proximity matrix providing quantified active damage measurements and passive damage measurements for each of the first, second, and third products in the mixed parcel order, wherein each of the active damage measurements and the passive damage measurements are based on:
stored product-to-product interaction data,
type and amount of packing material between the products,
a leakage risk and leak sensitivity for each product, and
the first, second, and third sets of indices;
iteratively optimize a three-dimensional arrangement of the products by:
calculating a current risk factor score based on the initial proximity matrix, external environmental factors, and selected packing materials,
modifying product orientations and packing material selections when the risk factor score exceeds a threshold, and
recalculating the risk factor score until the threshold is satisfied;
generate a packaging solution, wherein the packaging solution comprises the optimized three-dimensional arrangement, packing material specifications, and product orientations;
capture with a camera an image of the shipping box subsequent to packaging of the mixed parcel order in accordance with the packaging solution and prior to sealing of the shipping box for shipment;
associate in the data store the image of the shipping box with packaging statistics for the mixed parcel order; and responsive to a report of damage to any of the first product or the second product during shipment of the mixed parcel order, review the image to confirm correct implementation of the packaging solution.

18. The mixed parcel packaging system of claim 17, wherein each of the first set of indices, the second set of indices, and the third set of indices comprises any of a fragility index, a hostility index, a leakage index, and a leakage sensitivity index.

19. The mixed parcel packaging system of claim 17, wherein each of the first set of indices, the second set of indices, and the third set of indices comprises a fragility index, a hostility index, a leakage index, and a leakage sensitivity index.

20. The mixed parcel packaging system of claim 17, wherein the data store comprises an external factor index, and wherein the packaging solution is based on the external factor index.

21. The mixed parcel packaging system of claim 20, wherein the external factor index is defined by a plurality of external factors.

22. A computer-based method, the method performed by one or more computing devices, the method comprising:
receiving a first set of quantitative product attributes for a first product, wherein the first set of quantitative product attributes comprises a first volume attribute;
receiving a second set of quantitative product attributes for a second product, wherein the second set of quantitative product attributes comprises a second volume attribute;
receiving a first set of quantitative packaging attributes for a first packing material;
receiving a second set of quantitative packaging attributes for a second packing material;
receiving a mixed parcel order, wherein the mixed parcel order identifies the first product and the second product;
based on the first volume attribute and the second volume attribute, selecting a size of a shipping box for shipment of the mixed parcel order;
determining an initial proximity matrix providing quantified active damage measurements and passive damage measurements for each of the first product and the second product in the mixed parcel order, wherein each of the active damage measurements and the passive damage measurements are based on;
stored product-to-product interaction data,
type and amount of packing material between the products,
a leakage risk and leak sensitivity for each product, and
the first and second sets of quantitative product attributes;
iteratively optimizing a three-dimensional arrangement of the first product and second product by:
calculating a current risk factor score based on the initial proximity matrix, external environmental factors, and selected packing materials,
modifying product orientations and packing material selections when the risk factor score exceeds a threshold, and
recalculating the risk factor score until the threshold is satisfied;
generating packaging instructions comprising the optimized three-dimensional arrangement, packing material specifications, and product orientations;
capturing with a camera an image of the shipping box subsequent to packaging of the mixed parcel order in accordance with the packaging instructions and prior to sealing of the shipping box for shipment;
associating the image of the shipping box with packaging statistics for the mixed parcel order; and
responsive to a report of damage to any of the first product or the second product during shipment of the mixed parcel order, reviewing the image to confirm correct implementation of the packaging instructions.

23. The computer-based method of claim 22, wherein the packaging instructions comprise an indication of size of the shipping box, a placement orientation of the first product, a placement orientation of the second product, and the mixed parcel order packing material.

24. The computer-based method of claim 22, wherein each of the first set of quantitative product attributes and the second set of quantitative product attributes comprises any of a fragility index, a hostility index, a leakage index, and a leakage sensitivity index.

25. The mixed parcel packaging system of claim 22, wherein each of the first set of quantitative product attributes and the second set of quantitative product attributes comprises a fragility index, a hostility index, a leakage index, and a leakage sensitivity index.

* * * * *